United States Patent [19]

Stepanek

[11] 3,736,917
[45] June 5, 1973

[54] VENTING MEANS FOR COOKING UTENSIL

[75] Inventor: Frank E. Stepanek, La Grange Park, Ill.

[73] Assignee: American Home Products Corporation, New York, N.Y.

[22] Filed: Jan. 28, 1972

[21] Appl. No.: 221,625

[52] U.S. Cl. .............................. 126/389, 220/55 PC
[51] Int. Cl. ...................... A47j 27/08, A47j 27/092
[58] Field of Search ...................... 126/348, 388, 389; 220/44 E, 55 PC, 55 C, DIG. 27; 251/82

[56] References Cited

UNITED STATES PATENTS 2,462,287   2/1949   Richeson et al. .................. 126/389 X
1,834,837   12/1931  Hashimoto ...................... 220/55 PC Primary Examiner—William F. O'Dea
Assistant Examiner—William C. Anderson
Attorney—Robert D. Teichert and Donald J. Koprowski

[57] ABSTRACT

A valve for a cooking utensil has means to lock the same in an open position, in a closed position, or to allow the same to jiggle freely as an audible and visual warning signal when a predetermined vapor pressure has been reached in the utensil. The valve can be used for either "waterless" or regular cooking methods.

10 Claims, 5 Drawing Figures

PATENTED JUN 5 1973 3,736,917

3,736,917

VENTING MEANS FOR COOKING UTENSIL

BACKGROUND OF THE INVENTION

This invention relates to a valve for a cooking utensil and especially to a cooking utensil commonly known as a "waterless" cooker.

The term "waterless" cooker is applied generally to cooking utensils in which foods are cooked with a minimum of water but not necessarily without water. Such cookers are usually comprised of a pot or pan and a cover, the cover fitting snugly on the pan so that the moisture either adherent to the food or the small quantity of water added when starting the cooking operation is vaporized within the vessel. The vapors may then condense on the cover of the pan and drop back onto the food, basting the food in its own natural juices. This method of cooking is said to enhance and preserve the natural flavors, color and nutritional value of the food being cooked. Also, because the cooking is done almost entirely over low heat, the method provides for economy of fuel.

It is customary and desirable in the waterless method to start the cooking operation over a relatively medium heat to allow the cooking vapors to form as quickly as possible and thus to shorten the total cooking time. Once vapors are formed, however, the heat supplied must be reduced considerably to cook the food at a relatively constant, low temperature. If the heat is not reduced at this point, all the moisture in the vessel will be evaporated, the food in the pan burned, and the pan charred.

Heretofore various warning devices in the form of vents or valves have been employed to alert the cook to the fact that sufficient vapor pressure has built up in the vessel and that it is time to reduce the supply of heat. Many of these devices, while having some merit, have been very complex and expensive to manufacture.

One of the simpler types of warning devices is a valve that will flutter against the cover of the pan when enough vapor pressure has been built up inside the pan to raise the valve off the cover. One of the drawbacks inherent in prior valves of this type is that the valve may continue fluttering after the heat is reduced, with the resultant loss of the food vapors and annoyance to persons within earshot of the jiggling of the valve in the cover. Another disadvantage is that the prior art valves are not readily adaptable for use in regular cooking as well as waterless cooking.

The object of this invention, accordingly, is the provision of a valve for a cooking utensil that is equally suitable for use in waterless cooking or regular cooking methods, is simple and economical to manufacture, is quickly applied and removed from the pan cover and is easily cleaned.

SUMMARY OF THE INVENTION

The foregoing object is accomplished and the disadvantages of the prior art overcome by the provision of a valve that can be allowed to jiggle freely on the cover of a utensil and thus give an audible and visual warning signal to reduce the heat in the waterless cooking method; can be locked in a closed position to retain the natural food vapors and juices within the utensil and to prevent the annoyance of continuing jiggling, and can be locked in an open position when it is desirable to allow steam to escape, as for example in regular methods of cooking.

In the preferred embodiment, the cover of the pan has a circular aperture with a pair of diametrically opposed lugs projecting inwardly toward the middle of the aperture. The valve, substantially cylindrical in general outline, has a pair of diametrically opposed guide slots which slidably engage the lugs, which engagement permits reciprocable vertical movement of the valve within the aperture but restricts rotational movement therein. Each guide slot has an upper horizontal lock slot and a lower horizontal lock slot, the lock slots extending circumferentially to slidably engage the lugs to permit horizontal rotational movement of the valve within the aperture, but to restrict vertical reciprocable movement therein.

DESCRIPTION OF THE PREFERRED EMBODIMENT

Figure 1:
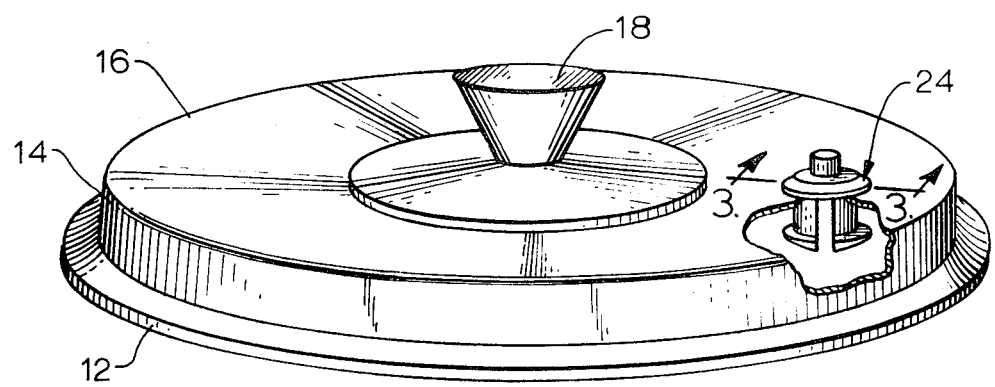
FIG. 1 is a top perspective view partially cutaway of a cover for a cooking utensil embodying the valve of my invention.

My invention, as shown in the drawings, is embodied in a cover 10 of a cooking utensil. While the shape of the cover is not critical to the invention, the cover illustrated is comprised of an annular outwardly projecting flange 12, a circumferential side wall 14 and a top wall 16. The top wall 16 is preferably concave for a purpose to be described hereinbelow. A suitable knob or handle 18 is secured in a conventional manner to the exterior of the top wall 16.

Figure 4:
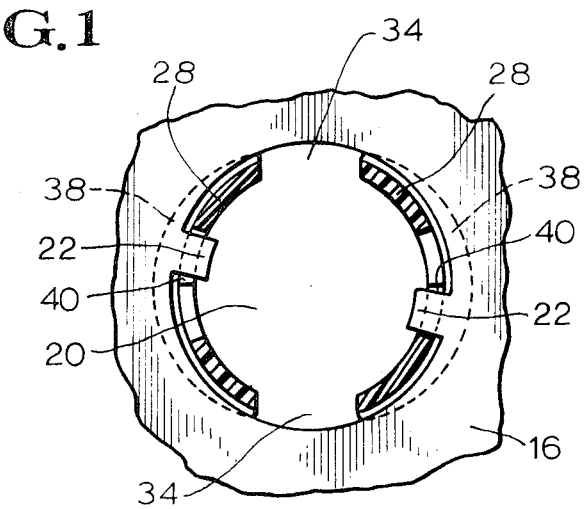
FIG. 4 is a plan view, partially cross-sectional, taken along line 4—4 of FIG. 3.

A substantially circular aperture 20 is provided in the top wall 16 of cover 10 as best shown in FIG. 4. A pair of diametrically opposed lugs 22 extend laterally from the top wall 16 toward the middle of the aperture 20 and serve a purpose to be described hereinbelow. If the top wall 16 of the cover 10 is not a flat surface, a flat annular surface must be provided around the aperture to permit the valve to seat properly.

The valve, generally designated by the numeral 24, is made of a single piece of material, preferably heat and moisture resistant somewhat resilient plastic, and is shaped to fit into aperture 20. It is comprised of a circular top 26, a wall 28 having the general outline of a cylinder, and an annular base 30. The top 26 and the base 30 have portions extending outwardly from the wall 28. A cylindrical knob 32, preferably knurled, protrudes upwardly from the top 26.

Figure 2:
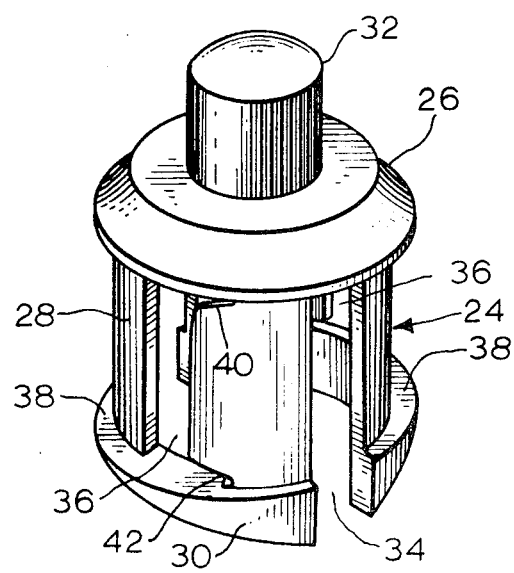
FIG. 2 is an enlarged perspective view of the valve of my invention.

A pair of vertical diametrically opposed vent slots 34 extend downwardly from the underside 35 of the top 26 of the valve and interrupt the wall 28 and the base 30. A pair of vertical, diametrically opposed guide slots 36 extend downwardly from the underside 35 of the top 26 of the valve to the upper surface 38 of the base 30, the guide slots 36 interrupting the wall 28. An upper horizontal lock slot 40 and a lower horizontal lock slot 42 extend circumferentially from each vertical guide slot 36 along the wall 28, all in the same direction. Obviously, while the horizontal lock slots 40 and 42 extend to the right as viewed in FIG. 2, they could extend to the left, or even in both directions, the choice being merely a matter of preference. Also, it should be understood that the shape of the top 26 and base 30 of the valve 24 are shown to be circular, other shapes may be used as long as both parts protrude outwardly from the wall 28 to limit upward and downward movement of the valve 24.

The valve 24 is easily inserted into the aperture 20 in the cover 10 by manually squeezing the wall 28 and base 30 at approximately the location of the vertical, diametrically opposed guide slots 36 so as to move the bottoms of the slots 36 toward each other. This relative movement of the wall 28 and base 30 is permitted by the interruptions therein provided by the vertical vent slots 34. The valve 24 is initially oriented so that the vertical guide slots 36 are aligned with the lugs 22 which extend into the aperture 20 as already described. The sides of the valve must be squeezed with enough force to enable the base 30 thereof to fit into the aperture 20. Once the base 30 has cleared the top wall 16 of the cover 10, the sides are released and the valve returns to its original shape, and the lugs 22 of the cover are in sliding engagement with the vertical guide slots 36. It is then in position to be manipulated for the desired cooking operation.

The wall 28 of the valve 24 is of a dimension circumferentially to permit the valve 24 to move slidably vertically within the aperture 20 in a somewhat loose, wobbly manner. The top 26 and base 30 are circumferentially larger than the aperture 20 to prevent accidental removal of the valve 24 from the aperture 20.

Figure 3:
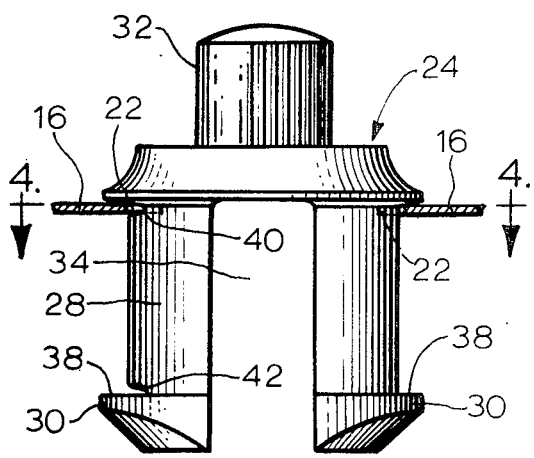
FIG. 3 is an enlarged elevational view of the valve of my invention taken along line 3—3 of FIG. 1 and showing the valve in a closed position on the cover.

With the form of construction described above and shown in the drawings it will be apparent that the valve 24 can be allowed to jiggle freely, can be allowed to rest and seat in a normal closed position, or it can be locked either in a full open position (FIG. 5) or a closed position (FIGS. 3 and 4).

As an example of the operation of the valve, its use in the waterless cooking method is described. The cook first places the food in the pan (not shown) with a small amount of water, or perhaps none at all, depending on the amount of natural moisture in the particular food. The cover 10 of the pan is then placed on the pan with the annular flange 12 snugly nesting in an upwardly facing annular groove (not shown) in the pan of a type well-known in waterless cooking utensils. The pan is then placed on a burner over medium heat. The valve 24 is in a resting or free seating position on the cover with the lugs 22 on the cover aligned vertically with vertical guide slots 36 and the underside of the top 26 of the valve 24 seating on the top wall 16 of cover 10. The utensil is relatively airtight, but the valve 24 will be free to move vertically reciprocally and jiggle against the top wall 16 of the cover 10 when the vapor pressure is sufficient to lift the valve 24 off its seating position on the cover 10. The cook is thus warned, both audibly and visually, that the heat should be reduced to complete the waterless cooking cycle over low heat. The valve 24 will then return to its lower seating position so that the food vapors will be retained in the utensil. The vapors will then condense on the inside of the cover and drop back onto the food, basting the food in its own natural juices. If the cover is concave as shown in FIG. 1 the juices will collect at the center and drip more directly onto the food.

To prevent the annoyance of further jiggling and the loss of natural moisture and flavors, the valve may be locked in this closed position by grasping the knob 32 and rotating the valve so that the lugs 22 engage the upper horizontal lock slots 40 as shown in FIGS. 3 and 4. To unlock the valve, it is merely rotated in the opposite direction to its original position.

Figure 5:
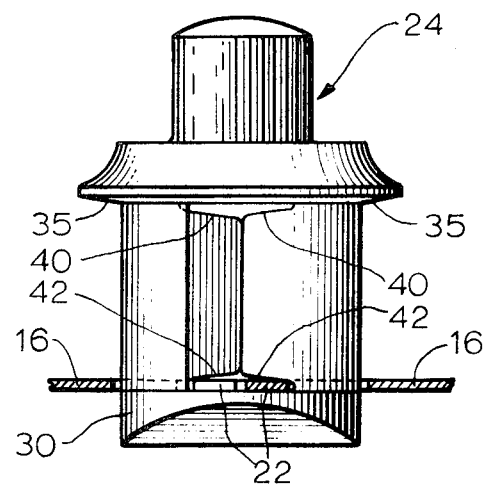
FIG. 5 is an elevational view of the valve of my invention showing the valve locked in a full open position on the cover.

For ordinary cooking, the valve 24 may be locked in the full open position by grasping the knob, lifting the valve until the upper surface 38 of base 30 abuts the underside of the top wall 16 of the cover 10 and rotating the valve so that the lugs 22 engage the lower horizontal lock slots 42, as shown in FIG. 5. Steam or vapor will then be allowed to emanate from the utensil through the vertical vent slots 34 as well as through the vertical guide slots 36, thereby to prevent jiggling of the cover 10 and the valve and possible boiling over of the contents of the utensil.

It should be obvious that more lock slots could be provided between the upper and lower lock slots 40 and 42 if it would be desired to have intermediate lock positions for the valve 24.

It should be apparent that the vertical vent slots 34, the vertical guide slots 36 and the lugs 22 need not necessarily be in pairs nor diametrically opposed, this arrangement being described specifically as one that provides for ease of manufacture, assembly, operation and orientation.

It is also thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A venting means for a cooking utensil comprising a cover and a valve, said cover having an aperture therein and at least one lug projecting inwardly toward the middle of said aperture, said valve being dimensioned to fit loosely in said aperture, and said valve comprising a base, a vertical wall extending upwardly from said base and a top, said base and said top having at least a portion thereof extending laterally outwardly of said wall, said wall having at least one vertical guide slot therein dimensioned to loosely slidably engage said lug to permit reciprocable vertical movement of said valve within said aperture but to restrict rotational movement therein, an upper horizontal lock slot extending circumferentially from the upper end of said guide slot and a lower horizontal lock slot extending circumferentially from the lower end of said guide slot, said upper horizontal lock slot being adapted to slidably engage said lug to permit horizontal rotational movement of said valve within said aperture but to restrict vertical reciprocable movement of said valve therein and thereby lock said valve in closed position and said lower horizontal lock slot being adapted to slidably engage said lug to permit horizontal rotational movement of said valve within said aperture but to restrict vertical reciprocable movement of said valve therein and thereby lock said valve in an open position.

2. A venting means according to claim 1 wherein said wall of said valve includes at least one vertical vent slot.

3. A venting means according to claim 1 wherein said cover has a pair of diametrically opposed lugs projective inwardly toward the middle of said aperture, said wall of said valve has a pair of diametrically opposed vertical guide slots and each of said guide slots has an upper and a lower horizontal lock slot.

4. A venting means according to claim 2 wherein said cover has a pair of diametrically opposed lugs projective inwardly toward the middle of said aperture, said wall of said valve has a pair of diametrically opposed vertical guide slots and each of said guide slots has an upper and a lower horizontal lock slot.

5. A venting means according to claim 4 wherein said wall of said valve includes a pair of diametrically opposed vertical vent slots.

6. A venting means according to claim 5 wherein said guide slots extend from said top of said wall of said valve to said base thereof and said vent slots extend downwardly from said top of said valve throughout the entire vertical dimension of said wall and said base.

7. A venting means according to claim 6 wherein said aperture is substantially circular in general outline and said wall of said valve is substantially cylindrical in general outline, the substantially circular outline of the aperture being interrupted by said lugs and the generally cylindrical outline of said wall of said valve being interrupted by said vertical guide slots and said vertical vent slots.

8. A venting means according to claim 7 wherein said base is substantially annular in general outline, said generally annular outline being interrupted by said vertical vent slots.

9. A venting means according to claim 8 including a cylindrical knob integral with said valve situated on said top of said valve for manually manipulating said valve.

10. A venting means according to claim 8 wherein said cover includes an annular flange outwardly projecting, a circumferential side wall extending upwardly from said flange and a concave top wall, said aperture being located in said concave top wall of said cover.

* * * * *